United States Patent
Linss et al.

(10) Patent No.: US 7,305,403 B1
(45) Date of Patent: Dec. 4, 2007

(54) METHOD AND DEVICE FOR STORING LINKED LISTS

(75) Inventors: Bernd Linss, Bad Salzdethfurth (DE); Martin Bergström, Campbell, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 10/167,918

(22) Filed: Jun. 12, 2002
(Under 37 CFR 1.47)

(30) Foreign Application Priority Data

Jun. 15, 2001 (EP) .................................. 01114518

(51) Int. Cl.
*G06F 7/00* (2006.01)
*G06F 12/00* (2006.01)
*G01R 29/00* (2006.01)

(52) U.S. Cl. ...................................... 707/101; 711/154
(58) Field of Classification Search ................ 707/102, 707/100, 200; 714/718, 48, 778; 370/395; 711/163, 114
See application file for complete search history.

(56) References Cited

U.S. PATENT DOCUMENTS

| | | | |
|---|---|---|---|
| 4,868,738 A * | 9/1989 | Kish et al. ..................... 710/26 |
| 5,319,778 A * | 6/1994 | Catino .......................... 707/102 |
| 5,539,879 A | 7/1996 | Pearce et al. ........... 395/184.01 |
| 5,920,561 A | 7/1999 | Daniel et al. ................. 370/395 |
| 6,044,445 A * | 3/2000 | Tsuda et al. ................. 711/163 |
| 6,173,431 B1 * | 1/2001 | Rittle ........................... 714/778 |
| 6,212,659 B1 * | 4/2001 | Zehavi ......................... 714/755 |
| 6,611,930 B1 * | 8/2003 | Ostrowsky et al. .......... 714/718 |
| 6,865,577 B1 * | 3/2005 | Sereda ......................... 707/100 |
| 6,952,740 B1 * | 10/2005 | Cain et al. .................... 709/238 |
| 7,024,593 B1 * | 4/2006 | Budd et al. .................... 714/48 |
| 2002/0129042 A1 * | 9/2002 | Bradshaw et al. ........... 707/200 |

* cited by examiner

*Primary Examiner*—Susan Chen (57) ABSTRACT

The invention provides for a method, a device, a use of the method and a computer program, all of which increase the security of linked lists for the storage of data. This is achieved by an improved protection against the destruction of data caused by defective pointer values pointing at elements of another linked list. For this purpose known methods for forming check sums, such as parity and cyclic redundancy check, for forming a second check sum allowing to check the pertinence of an element to a linked list, are used. Another aspect of the invention resides in the formation of a common check sum by using different methods for different lists.

22 Claims, 4 Drawing Sheets

METHOD AND DEVICE FOR STORING LINKED LISTS

TECHNICAL FIELD

The present invention relates to a method for calculating check sums for pointer values in elements of linked lists, as well as to a memory for linked lists.

DESCRIPTION OF THE RELATED ART

It is known that linked lists are a means for storing data, which is characterized by short access times and by a simple structure. Linked lists are, for example, described in the Encyclopedia of Computer Science, third edition, IEEE press 1993.

A characteristic feature of linked lists is that each element of the list contains a pointer value, which either indicates a storage location in which the subsequent element is stored, or the end of the list. Said lists help to organize high-speed and less laborious memories, which are, for instance, used in telecommunication networks, inter alia, for the storage of ATM (Asynchronous Transfer Mode) cells.

The U.S. Pat. No. 5,920,561 describes, for example, the use of linked lists in a node of an ATM network for organizing a high-speed memory.

Figure 1:
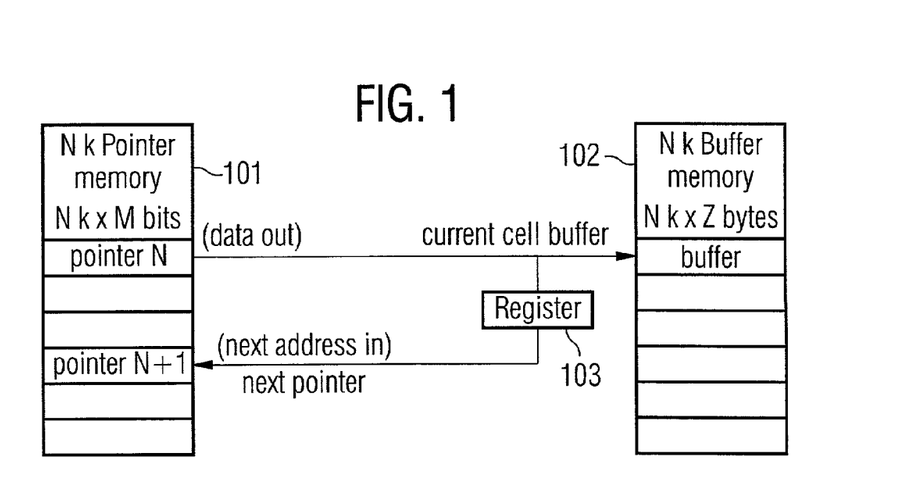
FIG. 1 shows a prior art memory organized by a linked list.

FIG. 1 shows the structure and the organization of a memory 102 for storing k data words having a length of Z bits, which is organized by a linked list with k elements and a pointer length of M bytes. The figure comprises a pointer memory 101 in which k pointer N of length M can be stored, a memory 102 in which k data words with a length Z can be stored and a register 103. The register 103 calculates the address of pointers. If a data word is stored, a pointer is stored in the pointer memory 101, which indicates the memory address of the data word in memory 102 and which contains the address of the subsequent pointer in the pointer memory 101. The address of the subsequent pointer is calculated by the register 103.

A drawback of linked lists resides in the fact that a defective pointer value in an element entails the loss of all subsequent elements. For avoiding said losses the data integrity of the pointer value has to be increased. Known methods for increasing the data integrity are, for example, the formation of parities or cyclic redundancy checks, which are likewise described in the aforementioned Encyclopedia of Computer Science.

Figure 2:
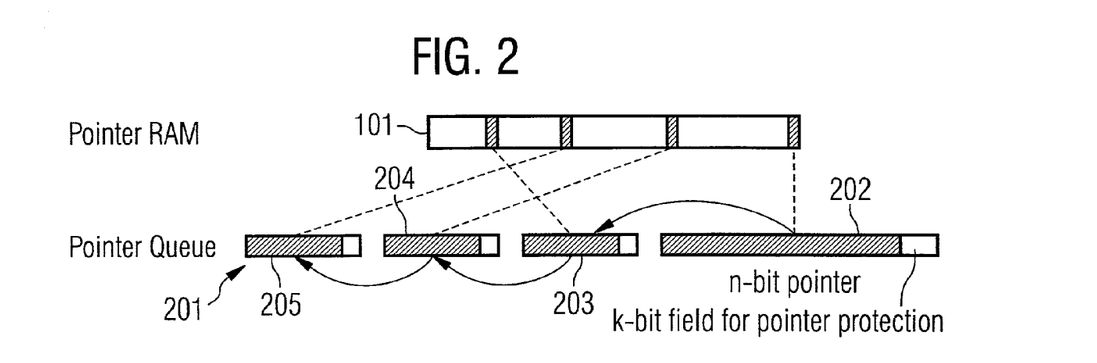
FIG. 2 shows a prior art linked list in a memory with direct access.

FIG. 2 shows a pointer memory 101 comprising a linked list of pointers 201 with elements 202, 203, 204 and 205. Each of said elements is formed of a pointer value having a length of n bit and a check sum field having the length k bit. The pointer having the length n indicates the subsequent element, which is shown by an arrow.

A defective pointer value is particularly harmful when it indicates a storage location in which data of another linked list are stored. If, for example, stored data of the other list are overwritten at this location by new data for the first linked list, the data of the other linked list get lost. If, for example, a pointer value of the other linked list is overwritten, the data of all subsequent elements of the other list may get lost. In such a case data of two linked lists get lost.

In order to reduce the loss of data due to defective pointer values, it would be possible to form a second check sum by the pointer value. This is, however, no protection against pointer values appearing to be plausible by multiple bit errors, but pointing to another linked list.

It is therefore object of the invention to provide a method and a device for limiting data losses caused by defective pointer values indicating the storage locations of another linked list to one list.

SUMMARY OF THE INVENTION

The present invention relates to a method and storage device for calculating check sums for pointer values in elements of linked lists. At least one first check sum is calculated for checking the pointer value. At least one second check sum is calculated for checking as to whether the pointer value indicates an element of the list or the end of the list or none or the two.

An advantage is provided by the use of a check sum for the protection against defective pointers in other linked lists. The calculation of check sums is well known to the person skilled in the art, and the invention can thus be introduced in the conversion in an easy manner and without a great deal of errors.

Especially advantageous is the calculation of the second check sum in accordance with various methods for various linked lists. It increases the security by means of which the defective association of elements to linked lists is detected.

Moreover advantageous is the use of a common check sum instead of two check sums. It reduces the amount of data to be stored and allows the saving of a calculation unit while the detection of defective associations to linked lists is still feasible.

Advantageous is the calculation of check sums by different parts of pointers for different linked. It increases the probability that a defective pointer value is detected as well as the probability that a defective pointer value pointing at an element of another linked list is detected.

Another advantage resides in the calculation of at least one check sum as a parity. The calculation of parities requires particularly little calculation efforts.

Another advantage is provided by the calculation of at least one check sum in the form of a cyclic redundancy check sum. Cyclic redundancy checks detect errors with a particularly high degree of likeliness.

Especially advantageous is the inclusion of contents of preceding elements into the calculation of at least one check sum. It allows to check the pertinence to the same linked list and offers particular security by securing the contents of preceding elements by check sums via said elements already beforehand.

Moreover advantageous is the calculation of at least one check sum which includes the number of preceding elements. It can thereby be detected particularly fast as to whether an element is missing or whether an additional element was inserted in the list without authorization.

DETAILED DESCRIPTION OF THE INVENTION

The invention provides for a method, a device, a use of the method and a computer program for storing a plurality of linked lists, whereby known methods for forming the check sums, such as parity and cyclic redundancy check, are applied in a novel and inventive manner.

The check as to whether a pointer indicates an element of a certain linked list is allowed by a second check sum. Said second check sum may, for example, be a list number, a bit sequence, a value calculated from contents of preceding pointers or a value calculated from the number of preceding pointers. Another possibility resides in the calculation of the first and/or second check sum according to different methods for different linked lists. In both cases, an element with a defective pointer value, which has a plausible check sum in a first linked list due to multiple errors, is immediately detected as being defective in any other linked list.

The invention will hereinafter be explained by means of figures and embodiments, whereby identical reference numbers designate identical components. The explanations furnished in the example for the formation of parities apply to the same extent also to other methods of forming check sums. The invention is not limited to the formation of parities, but includes all methods for generating check sums known to the skilled person, such as the cyclic redundancy check.

Figure 3:
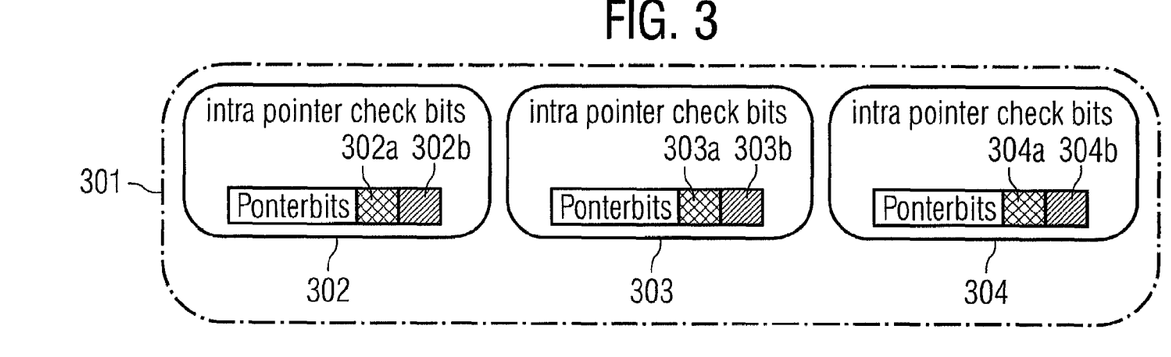
FIG. 3 shows a linked list according to the invention with a first and a second check sum.

FIG. 3 shows a linked list 301 according to the invention with elements 302, 303 and 304. Each of the elements contains a first check sum 302$a$, 303$a$ or 304$a$ for checking the pointer value, and a second check sum 302$b$, 303$b$ or 304$b$ for checking as to whether or not the element pertains to the linked list. Examples as to how the said second check sum can be formed are explained in more detail by means of FIGS. 5 and 6. The first check sum is, for instance, a parity or a check sum calculated by a cyclic redundancy check. The formation of the first check sum is prior art and known to the person skilled in the art.

The second check sum serves to check as to whether or not an element pertains to the list, and is formed in accordance with a provision taking into account the contents and/or number of preceding elements. This allows the immediate detection that an element of another list does not pertain to the linked list, and the contents of said element is not overwritten. Thus, the contents of the element remains preserved and the loss of elements succeeding said element is avoided. In an embodiment of the invention the second check sum is formed of at least one bit taken from a bit sequence, whereby at least one corresponding bit of the bit sequence is associated to each element of a linked list. In a preferred embodiment of the invention different bit sequences are used for different linked lists. Thus, for example, the bit sequence "010101010101" is associated to a first linked list, and the bit sequence "111111111111" is associated to a second linked list.

The check sum of the first element of the first linked list thus is a "0", the check sum of the first element of the second linked list thus is a "1". The probability with which a wrong element in a list is detected increases with the length of the check sum. In a one bit check sum the check sum of the second elements of both linked lists is, in the present example, a "1". Given a two bit check sum, the check sums in the present example are always different, "01" or "11" respectively.

According to a preferred embodiment the bit sequences and the length of the check sums are selected such that a secure distinction between different linked lists is possible. In the present example showing two linked lists and a one bit check sum these are the bit sequences "000000000000" and "111111111111", so-called orthogonal bit sequences. Orthogonal bit sequences are known to the skilled person from the CDMA (Code Division Multiple Access) method.

In another embodiment the elements of a bit sequence are associated to elements of a linked list by means of a modulo operation.

In another embodiment differently long bit sequences are used for different lists, whereby the modulo operation is carried out with an operand corresponding to the respective bit sequence length.

According to a preferred embodiment check sums are formed by parts of a pointer, whereby different assignments are used for different lists.

Figure 4A:
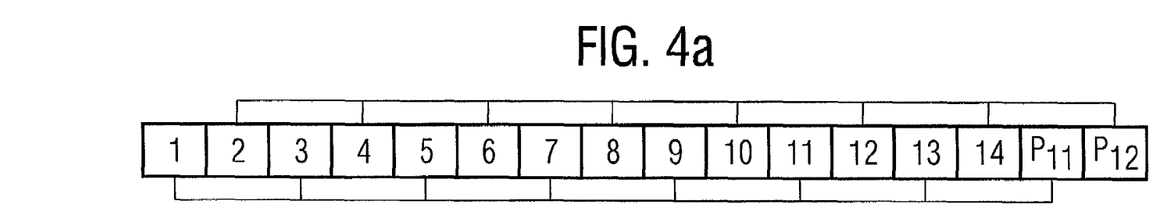
FIG. 4a shows a method according to the invention for calculating a common check sum.
Figure 4B:
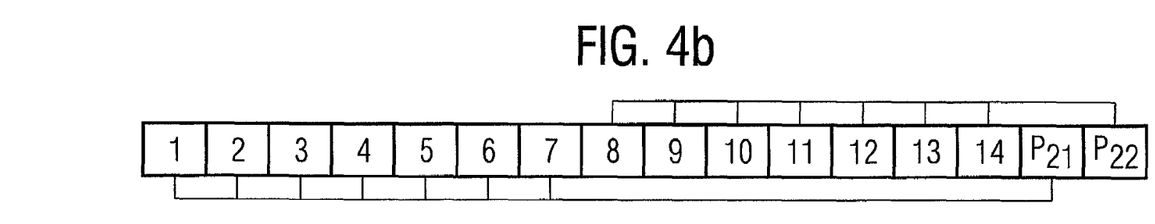
FIG. 4b shows an additional method according to the invention for calculating a common check sum.

FIGS. 4$a$ and 4$b$ show embodiments of methods for forming a common check sum. The method works for each check sum, for instance, the first or the second check sum. The common check sum serves to check a pointer value and as to whether an element pertains to another linked list. For this purpose the common check sum is formed by the pointer value for different linked lists according to different provisions.

According to the example shown in FIG. 4$a$ a two bit parity is formed by a fourteen bit pointer value. The parity for the first check bit P11 is formed by bits at the odd positions of the pointer value. The parity for the second check bit P12 is formed by bits at the even positions of the pointer value. In the drawing this procedure is illustrated by arrows.

According to the example shown in FIG. 4$b$ a two bit parity is likewise formed by a fourteen bit pointer value. The first check bit P21 is thereby formed as parity by the first seven bits, and second check bit P22 is formed as parity by bits eight to fourteen.

FIGS. 4$a$ and 4$b$ only constitute two possibilities as to how a pointer value can be assigned. Basically any division, also in more than two parts, may be used for the method.

In another embodiment of the invention also different parities, e.g. even and odd parity or multi-place parities, can be combined for different lists.

Figure 5:
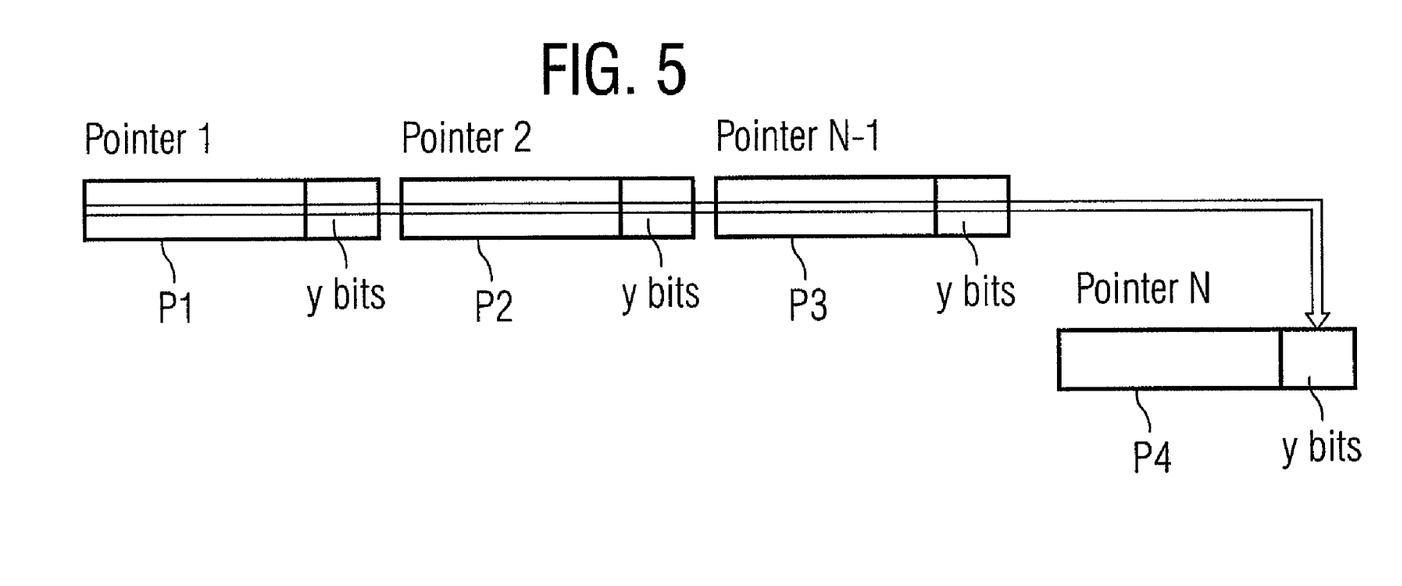
FIG. 5 shows a method according to the invention for calculating a second check sum.

FIG. 5 shows a method according to the invention for calculating a second check sum, whereby contents of preceding elements of the list are used for said calculation. Illustrated are pointers P1, P2, P3 and P4 with their respective check sums, which are stored in y bits. The value of the second check sum for P4 depends, for instance, on the check sum values of the preceding pointers or on the pointer values of the preceding pointers. In another embodiment the check sum value is calculated from a combination of both.

Figure 6:
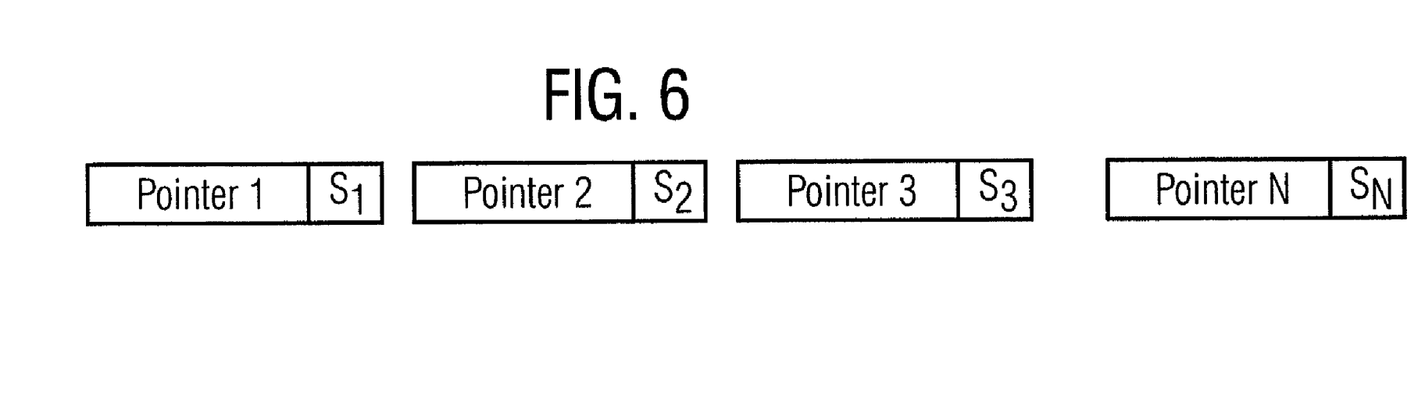
FIG. 6 shows an additional method according to the invention for calculating a second check sum.

FIG. 6 shows another method according to the invention for calculating a second check sum, whereby the check sum value depends on the number of the preceding elements. Thus, the check sum can, for instance, be the number of the preceding elements, possibly a modulo number of the preceding elements in response to the length of the check sum. In FIG. 6 the pointers are pointer 1, pointer 2, pointer 3 and pointer N with their respective check sum fields S1, S2, S3 and SN. The check sum fields contain a pointer numbering so that a "1" is stored in field S1, a "2" is stored in field S2 and the number "N" is stored in SN.

According to another embodiment the number of the pointer is stored in the check sum field according to a modulo operation. Field SN, for example, contains the number N modulo 16 with a four bit length of the check sum field.

Figure 7:
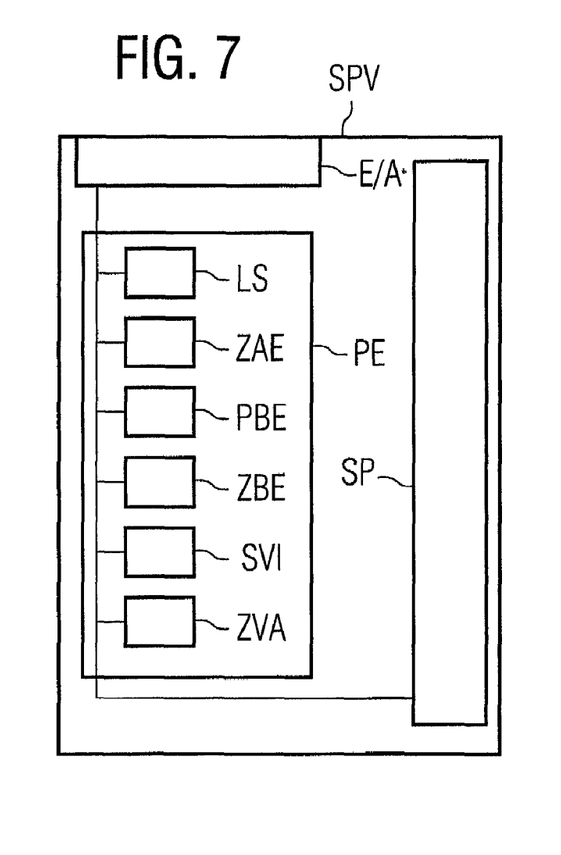
FIG. 7 shows a storage device according to the invention having a common check unit.

In another embodiment of the invention the second check sum is a list number. FIG. 7 shows an inventive storage device SPV with a common check unit PE. The storage device SPV comprises an input/output unit E/A, a memory SP and a common check unit PE for determining and checking check sums by a pointer value and for checking as to whether or not a pointer value points at a succeeding element of the list or, respectively, at the end of the list. A register for determining pointer values is integrated in the input/output unit.

The function of the storage device will hereinafter be explained for the better understanding thereof by the example of storing asynchronous transfer mode cells. The invention is not limited to said application and functions for the storage of arbitrarily linked lists being able to store optional contents.

An asynchronous transfer mode cell is received by an input/output unit E/A and is associated to a linked list. Such an association takes place, for example, in response to so-called service classes. The register integrated in the input/output unit associates the following value to the pointer: "01011001".

The input/output unit E/A associates the cell to a first linked list.

The logic circuit LS determines the provision for calculating a check sum associated to the first linked list, and adjusts the pointer value division unit ZAE accordingly.

In a preferred embodiment said adjustment is effected by the selection of a sequence of logic gates from a plurality of logic gates.

In another embodiment the adjustment is effected by the selection of bit masks.

The logic circuit LS detects that the check sum is calculated by the parity calculation unit PBE as parity, and not by the calculation unit ZBE as a cyclic redundancy check sum.

Other methods for calculating check sums can basically be used. In the example, the method was limited to said two possibilities for the better understanding thereof.

In the example, the three bit check sum is calculated as an even parity, whereby the first bit is calculated by the first half of the pointer value and the second bit is calculated by the second half of the pointer. The following value accordingly results for both bits: "00". The third bit is calculated by the entire pointer value of the element and the pointer value of its predecessor. For this purpose, the parity calculation unit inquires the pointer value of the preceding element of the first linked list from the memory for storing contents of preceding elements SVI. The memory provides the following value for the predecessor: "01110011". Thus, the third bit has the value "1" and the check sum has the value "001".

According to another embodiment at least one bit is calculated by using the number of the preceding elements. For this purpose, the number of the preceding elements for a linked list is read out from the counter ZVA for storing the number of elements of linked lists.

Another ATM cell is received in the input/output unit E/A and is associated to a second linked list. The register associates the value "10000111" to the pointer. The logic circuit LS selects the provision for calculating the check sum associated to the second linked list, and adjusts the pointer division unit ZAE accordingly.

A three bit check sum as even parity is calculated for the second linked list, whereby the first bit is calculated by the bits at odd positions of the pointer value and the second bit by the bits at even positions of the pointer value. Thus the value "00" is formed for the first two bits. The third bit is calculated as modulo number by the number of the elements in the second linked list. For this purpose, the number is read out from the counter ZVA for storing the number of elements of linked lists and is processed in the parity calculation unit. As only one bit is used for the storage, a modulo 2 operation is carried out. The element is the seventh element of the second linked list resulting in the value "1" for the third check bit. The check sum, therefore, likewise has the value "001".

By a short interfering pulse associations have been modified such that the element of the first list was associated to the second list and vice versa. The elements are read out and checked. The element originally pertaining to the first list has the value "010111001" with check bits "001". It is now checked in accordance with the provision of the second linked list, whereby it is found that the first check bit should have the value "1" if the pointer value was correct. The error is detected. The element originally pertaining to the second list has the value "10000111" with check bits "001". In this case, too, the first check bit already deviates, and the error is detected.

The detection of defective list associations is here implicitly effected by the deviating results when the check sums are calculated. As different methods for different linked lists are used, defective associations are detected with a particularly high probability.

In another embodiment the check sum only consists of the first two check bits.

Figure 8:
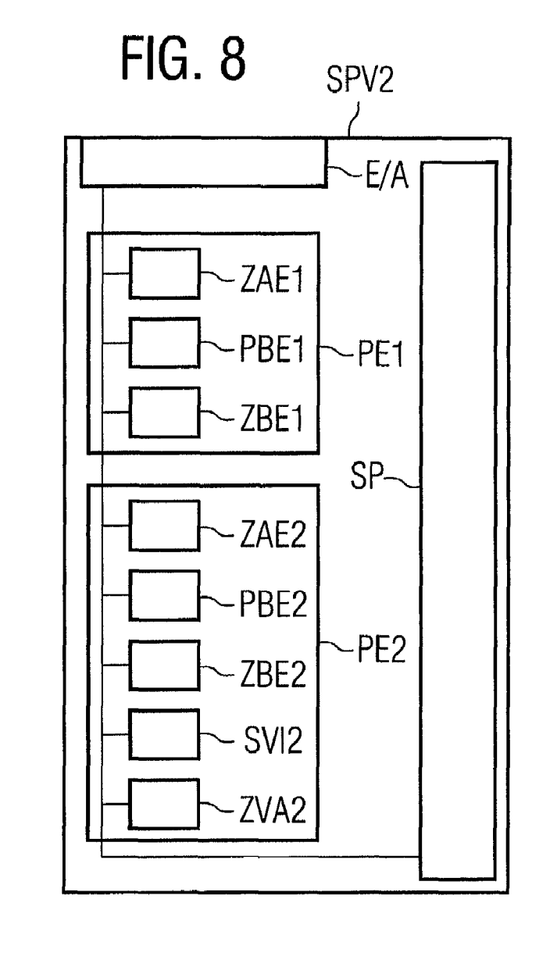
FIG. 8 shows a storage device according to the invention having a first and a second check unit.

FIG. 8 illustrates a block diagram of a storage device according to the invention comprising a first and a second check unit.

The storage device comprises an input/output unit E/A, which includes a register, a memory SP, a first check unit PE1 and a second check unit PE2.

The first check unit PE1 comprises a pointer division unit ZAE1, a parity calculation unit PBE1 and a calculation unit for calculating cyclic redundancy check sums ZBE1.

The second check unit PE2 comprises a pointer division unit ZAE2, a parity calculation unit PBE2, a calculation unit for calculating cyclic redundancy check sums ZBE2, a memory for storing contents of preceding elements of linked lists SVI2 and a counter for storing the number of preceding elements of linked lists ZVA2.

If an element of a linked list is stored, the first check unit calculates a first check sum by the pointer value of the element. The second check unit calculates a second check sum, which serves to check whether an element had been associated to the linked list in which it was found.

In an embodiment of the invention the calculation of at least one check sum is a carried out by a computer program.

In another embodiment the calculation of at least one check sum is carried out by a software module.

In a preferred embodiment the calculation of at least one check sum is carried out by an ASIC (Application Specific Integrated Circuit).

We claim:

1. A method for calculating check sums for a pointer value in a given element of a first linked list in a memory in which a plurality of linked lists are stored, said method comprising the steps of:

calculating a first check sum for checking the pointer value;

calculating a second check sum based on contents of preceding elements of the first linked list and the number of preceding elements, said second check sum for checking whether the pointer value indicates one of the elements of the first list, the end of the first list, or neither one of the elements nor the end of the first list; and if the pointer value indicates one of the elements of the first list or the end of the first list, determining that address information in the pointer value is correct; and if the pointer value does not indicate one of the elements of the first list or the end of the first list, determining that address information in the pointer value is faulty, and preventing the element at the faulty address from being overwritten.

2. The method according to claim 1, comprising the additional step of realizing the first and second check sums in a common check sum.

3. The method according to claim 1, comprising the additional step of calculating at least a two-part common check sum, wherein each part of the two-part common check sum is respectively calculated from one part of the pointer value and wherein a division for different linked lists is different.

4. The method according to claim 3, wherein at least one of the first check sum, the second check sum, and at least one part of the two-part common check sum is a parity.

5. The method according to claim 3, comprising the additional step of determining the first check sum by a cyclic redundancy check.

6. The method according to claim 1, wherein each element includes a pointer value and a check sum, and the step of calculating the second check sum based on the contents of the preceding elements includes calculating the second check sum utilizing the pointer values of the preceding elements.

7. The method according to claim 1, wherein each element includes a pointer value and a check sum, and the step of calculating the second check sum based on the contents of the preceding elements includes calculating the second check sum utilizing the check sums of the preceding elements.

8. A storage device for storing a plurality of linked lists, each linked list comprising at least a first element and a next element and at least one pointer, wherein in a given list, the pointer indicates either a storage location where the next element of the given list is stored or an end of the given list, the storage device comprising:

a register for determining pointer values;

a first check unit for determining and checking a first check sum by the pointer value;

a second check unit for calculating and checking a second check sum based on contents of preceding elements of the given list and the number of preceding elements, said second check sum for checking whether the pointer value points at the next element of the given list, at the end of the given list, or at neither the next element nor the end of the given list; and means responsive to a determination that the pointer value does not indicate one of the elements of the given list or the end of the given list, for determining that address information in the pointer value is faulty, and preventing the element at the faulty address from being overwritten.

9. The storage device according to claim 8, wherein at least one of the first check unit and second check unit comprises a logic circuit selecting, for different linked lists, different provisions for determining or checking the check sum.

10. The storage device according to claim 8, wherein the first and the second check units are realized in a common check unit.

11. The storage device according to claim 8, wherein at least one of the first check unit and the second check unit comprises a pointer value division unit.

12. The storage device according to claim 8, wherein at least one of the first check unit and the second check unit comprises a parity calculation unit.

13. The storage device according to claim 8, wherein the first check unit comprises a calculation unit for calculating a cyclic redundancy check sum.

14. The storage device according to claim 8, wherein the storage device intermediately stores asynchronous transfer mode cells in an asynchronous transfer mode switching center.

15. The storage device according to claim 8, wherein each element includes a pointer value and a check sum, and the means for calculating and checking the second check sum based on the contents of the preceding elements of the given list includes means for calculating the second check sum utilizing the pointer values of the preceding elements.

16. The storage device according to claim 8, wherein each element includes a pointer value and a check sum, and the means for calculating and checking the second check sum based on the contents of the preceding elements of the given list includes means for calculating the second check sum utilizing the check sums of the preceding elements.

17. A computer-readable medium for storing executable software code, said software code comprising instructions for:

calculating a first check sum for checking a pointer value in a given element of a first linked list of a plurality of linked lists stored in a memory;

calculating a second check sum based on contents of preceding elements of the first linked list and the number of preceding elements, said second check sum for checking whether the pointer value indicates one of the elements of the first list, the end of the first list, or neither one of the elements nor the end of the first list; and if the pointer value indicates one of the elements of the first list or the end of the first list, determining that address information in the pointer value is correct; and if the pointer value does not indicate one of the elements of the first list or the end of the first list, determining that address information in the pointer value is faulty, and preventing the element at the faulty address from being overwritten.

18. The computer-readable medium of claim 17, wherein said software code further comprises instructions for realizing the first and second check sums in a common check sum.

19. The computer-readable medium of claim 17, wherein said software code further comprises instructions for calculating at least a two-part common check sum, wherein each part of the two-part common check sum is respectively calculated from one part of the pointer value and wherein a division for different linked lists is different.

20. The computer-readable medium of claim 19, wherein said software code further comprises instructions for determining the first check sum by a cyclic redundancy check.

21. The computer-readable medium of claim 17, wherein each element includes a pointer value and a check sum, and the step of calculating the second check sum based on contents of preceding elements of the first linked list includes calculating the second check sum utilizing the pointer values of the preceding elements.

22. The computer-readable medium of claim 17, wherein each element includes a pointer value and a check sum, and the step of calculating the second check sum based on contents of preceding elements of the first linked list includes calculating the second check sum utilizing the check sums of the preceding elements.

* * * * *

UNITED STATES PATENT AND TRADEMARK OFFICE
CERTIFICATE OF CORRECTION

| | | |
|---|---|---|
| PATENT NO. | : 7,305,403 B1 | Page 1 of 1 |
| APPLICATION NO. | : 10/167918 | |
| DATED | : December 4, 2007 | |
| INVENTOR(S) | : Linss et al. | |

It is certified that error appears in the above-identified patent and that said Letters Patent is hereby corrected as shown below:

In Column 6, Line 21, delete ""010111001"" and insert -- "01011001" --, therefor.

In Column 6, Line 57, delete "a" before "carried".

Signed and Sealed this

Fourth Day of November, 2008

JON W. DUDAS
*Director of the United States Patent and Trademark Office*